(Model.)
G. B. BERRELL.
REDUCING AND MIXING MACHINE FOR FERTILIZERS.
No. 256,115.  Patented Apr. 11, 1882.
2 Sheets—Sheet 1.
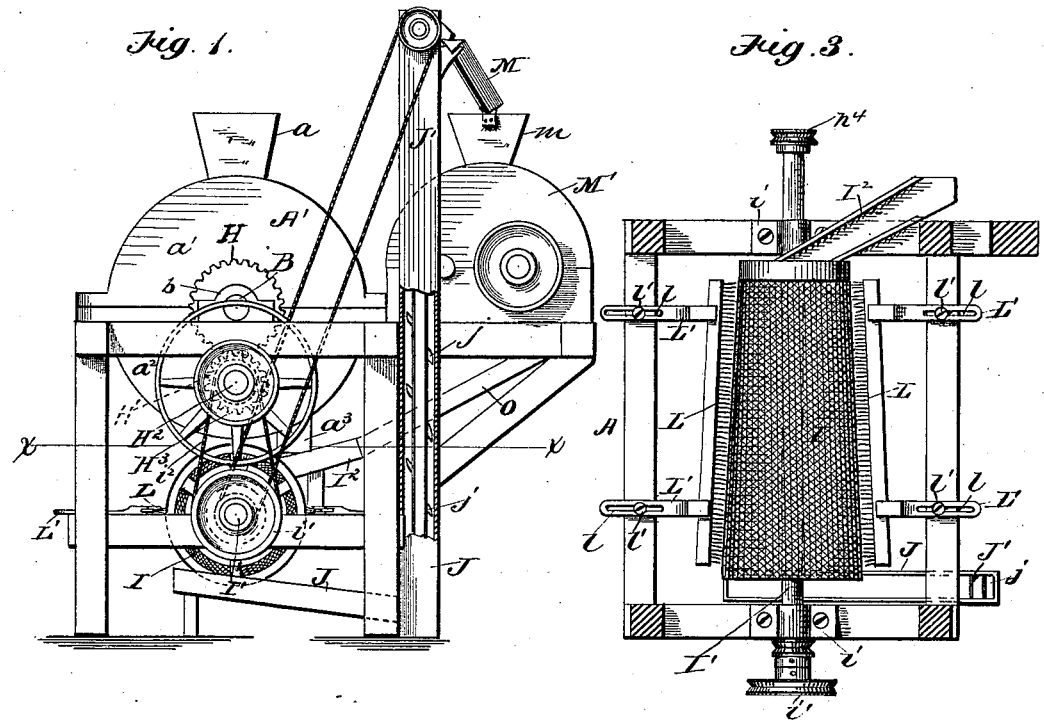
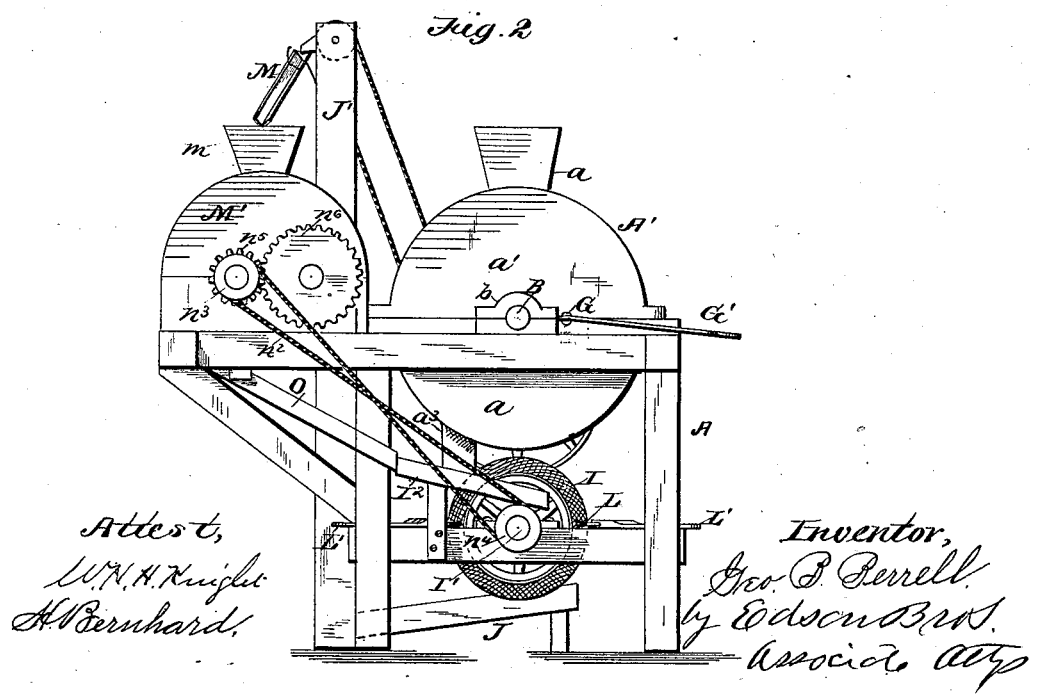
Attest,
W. H. H. Knight
H. Bernhard
Inventor,
Geo. B. Berrell
by Edson Bros.
Associate Attys (Model.)

G. B. BERRELL.

REDUCING AND MIXING MACHINE FOR FERTILIZERS.

No. 256,115. Patented Apr. 11, 1882.

2 Sheets—Sheet 2.

Attest,
W. H. H. Knight
H. Bernhard

Inventor,
Geo. B. Berrell
by Edson Bros
Associate Atty

UNITED STATES PATENT OFFICE.

GEORGE B. BERRELL, OF ABINGTON, PENNSYLVANIA.

REDUCING AND MIXING MACHINE FOR FERTILIZERS.

SPECIFICATION forming part of Letters Patent No. 256,115, dated April 11, 1882.

Application filed October 16, 1880. (Model.)

*To all whom it may concern:*

Be it known that I, GEORGE B. BERRELL, residing at Abington, in the county of Montgomery and State of Pennsylvania, have made certain new and useful Improvements in Reducing and Mixing Machines for Fertilizers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 4:
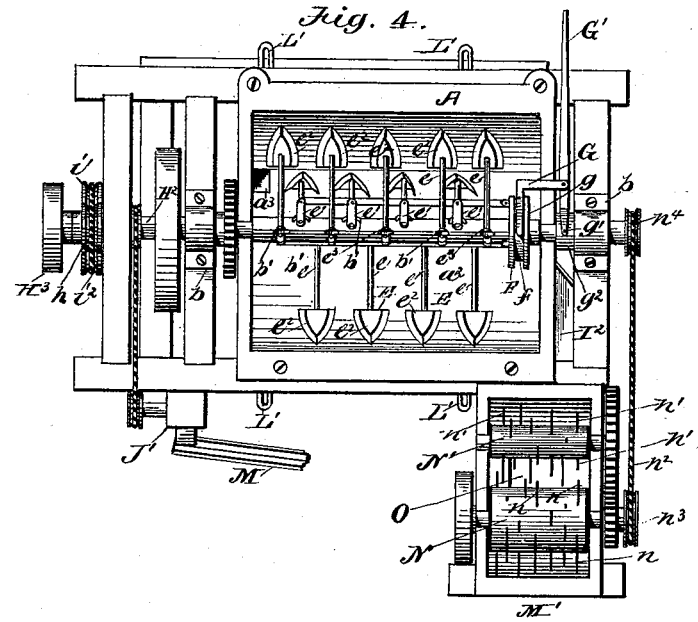
Figure 5:
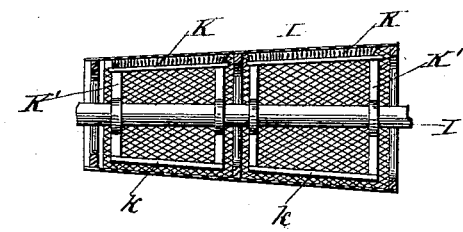
Figure 6:
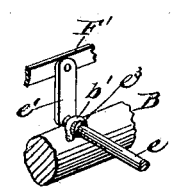
Figure 7:
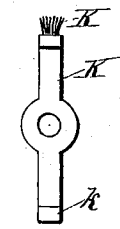

Figure 1 represents an elevation of the right-hand side of my improved reducing and mixing machine. Fig. 2 is an elevation of the opposite (left-hand) side of the machine. Fig. 3 represents a horizontal sectional view, taken on the line $x\ x$ of Fig. 1, showing the rotating screen, brushes, and means for adjusting said brushes. Fig. 4 represents a top plan view, the upper half of each of the mixing and reducing drums removed to show their contained mechanism. Fig. 5 represents a longitudinal section taken through the sifting-screen; and Figs. 6 and 7 represent detail views of parts of the machine.

Similar letters of reference in the several drawings denote similar parts.

The operation of mixing commercial manure or fertilizers has been heretofore a very slow and unsatisfactory, as well as an unhealthy and filthy, one, inasmuch as the operator has been and is compelled to mix the several ingredients contained in said manure and fertilizers by the spade or fork upon a floor or platform, which operation is, as will be readily understood, a very imperfect one, the adhesive nature of some of the ingredients rendering them very hard to mix with other substances.

To remedy the above-named defects, and at the same time to provide a simple, durable, and easily-operated machine, wherein the several ingredients of the above-named commercial manure or fertilizers shall be reduced, mixed together, sifted, and prepared for market in quicker time and in more thorough manner than heretofore known or practiced, has been the object of this invention; and to the accomplishment of this end it consists in a reducing and mixing machine provided with drums wherein the several ingredients are thoroughly broken and mixed, and further provided with means whereby to regulate the breaking and mixing spades with reference to the composition acted on, substantially as hereinafter described.

It further consists in means whereby the said manure or fertilizer, after being acted upon by the breaking and mixing spades, shall be sifted, substantially as described hereinafter.

Referring to the drawings, A represents the frame of the machine.

$A'$ represents the mixing-drum, provided at its top with a hopper, $a$. The drum $A'$ is made in two parts, $a'\ a^2$, the upper of which parts, $a'$, is made removable for the purpose of giving ready access to the interior of said drum. The lower part, $a^2$, is provided with an adjustable outlet, $a^3$, whereby the contents of the drum may be discharged.

Journaled in suitable boxes, $b$, at each side of the machine is a shaft, B, that passes through the drum, as shown in Fig. 4.

$b'$ represents eyes or sockets projecting from the shaft B within the drum. The eyes or sockets $b'$ are set in rows, of which rows there are three in number, each row being equidistant from the other. The eyes or sockets $b'$ are also placed at equal distances from each other, and are so placed as to alternate each with the one next adjoining in the next row. The apertures in the eyes or sockets are at right angles with the axis of the shaft B.

E represents spades, the inner ends of the shanks or handles $e$ of which pass through the eyes or sockets $b'$, the ends of said handles being bent at right angles to their axes, as shown at $e'$, said bent part $e'$ being also at right angles to the plane of the spade-blades $e^2$. The longitudinal movement of the handles $e$ is limited in the eyes $b'$ by the bent arms $e'$ upon the one side and collars $e^3$ upon the other side of the eyes or sockets $b'$.

It will be seen that when the arms $e'$ are perpendicular to the shaft B the blades $a^2$ of the spades will be in the same plane as the shaft B, the purpose of which construction will be hereinafter set forth.

Upon one end of the shaft B, within the drum $A'$, is a sliding collar, F, the surface or periphery of which is provided with a groove, $f$.

From the collar F extend connecting rods or bars F', to which bars are pivoted the ends of the bent arms e' of the spade handles or shanks e.

G represents a shipper, one end of which, g, is bifurcated and partially encircles the collar F, fitting into the groove therein. The opposite end of the shipper G is bent at right angles and passes out through the side or end of the drum A', and is pivoted to a lever, G', having a bifurcated end, g', pivoted to a collar, $g^2$, upon the shaft B and outside the drum, as shown.

It will be seen that when the collar F is moved to and fro on the shaft B by the lever G' said movement will cause (through the bars F' and bent arms e') the handles e to oscillate in the eyes or sockets b', whereby the spade-blades $e^2$ are set at more or less of an angle with the plane of the shaft B, and thereby causes said spade-blades $e^2$ to act as conveyers for the purpose of discharging the contents of the drum.

The shaft B is provided upon one end with a gear-wheel, H, that engages with and is driven by a similar gear-wheel, H', upon one end of a short counter-shaft, $H^2$, journaled in hangers on the frame A. The opposite end of the counter-shaft $H^2$ is provided with a pulley, $H^3$, to which power is applied.

Directly beneath the drum A' is placed a rotating screen, I, on a shaft, I', journaled in boxes i' upon the frame and driven from the counter-shaft $H^2$ by means of pulleys h and i' and cord-belt $i^2$. The rotating screen I is larger at one end than the other, the smaller end acting as the feed end, and into this end empties the outer end of a spout, $I^2$. The opposite larger end of the screen I is provided at its lower side with a chute, J, which empties into the lower end of an elevator, J', the purpose of which will be presently explained. The screen I is provided upon its inside with metallic brushes K, attached to a frame, K', pendent upon the shaft I'. The lower rail, k, of the frame K' is weighted, whereby the rail containing the brush K is at all times kept at the top of the screen and in contact with the inner surface of said screen.

L represents metallic brushes held normally against the outer surface of the screen I by arms L', that extend to the frame of the machine. The arms L' are provided with slots l, through which slots pass screws l', for the purpose of adjusting the brushes L.

The object of the brushes L and K is to keep the meshes of the wire-cloth, of which the rotating screen is constructed, free from clogging, and also to aid the discharge of the finer parts of the mixed material through the meshes of said cloth. All lumpy portions, or portions not small enough to pass through the meshes of the wire-cloth, are discharged from the screen into the chute J; thence they pass to the elevator J', in which they are raised by a series of buckets, j, attached to an endless belt in said elevator, to and emptied into a chute, M, that extends from the top of the elevator to the hopper m upon the top of the reducing-drum M'. The said lumpy and unscreened material passes into the reducing-drum M' and falls upon the teeth n n' of two cylinders, N N', journaled in the sides of the drum M'. The cylinder N is rotated by a belt, $n^2$, and grooved pulleys $n^3$ $n^4$ upon the shaft of said cylinder N and the outer end of the shaft I' respectively. On one end of the shaft of cylinder N is secured a gear-pinion, $n^5$, that engages with and rotates a spur-wheel, $n^6$, on the shaft of cylinder N'. From the reducing-drum M' the material passes into a chute, O, by which it is conveyed to the chute or spout $I^2$, and thence to the screen I. The chute or spout $I^2$ is directly beneath the adjustable outlet $a^3$ of the drum A', the contents of said drum being conveyed through said outlet $a^3$ and chute or spout $I^2$ to the screen when the blades of the spades are set angular, as hereinbefore described.

From the conical shape of the screen I it will readily be seen that all lumpy or unscreened material will naturally seek the lowest point, said point in this instance being the larger or discharge end of the screen, and so pass to the reducing-drum for reworking.

Having thus described my invention, what I claim is—

1. In a reducing and mixing machine, the arms e', formed upon or attached to the ends of the shanks or handles e of the mixing-spades E, the said arms e' projecting from said shanks e at right angles to the axis of said shanks, and also at right angles to the plane of the spade-blades, substantially as described.

2. In a reducing and mixing machine, the combination of the shaft B, having eyes or sockets b', with the shanks or handles e of the mixing-spades E, said shanks e being loosely pivoted in the eyes or sockets b, and provided with arms e' at right angles to the axis of said shanks, substantially as described, for the purpose specified.

3. In a reducing and mixing machine, the sliding collar F, situate upon the shaft B within the drum A', and provided with the peripheral groove f, and having connecting rods or bars F', connected thereto, substantially as described, for the purpose specified.

4. In a reducing and mixing machine, the combination of the mixing-spades E, having shanks e, provided with the arms e', with the connecting-bars F', sliding collar F, and shaft B, having eyes or sockets b', substantially as described.

5. In a reducing and mixing machine, the combination of the sliding collar F, having the peripheral groove f and situate upon the shaft B, with the shipper G, having the bifurcated end g, said shipper passing through the end of the mixing-drum and attached to and operated by the lever G, substantially as described, for the purpose specified.

6. In a reducing and mixing machine, the combination of the mixing-drum A', having outlet $a^3$ and provided with the adjustable mixing-spades E, with the conical rotating screen I, provided upon its outside with the adjustable metallic brushes L and upon its inside with the brush K, attached to the frame K', pendent upon the shaft I', substantially as described, for the purpose specified.

7. In a reducing and mixing machine, the combination of the mixing-drum A', having adjustable mixing-spades E, with the conical rotating screen I, having adjustable brushes L and brush K, chutes or spouts J, O, and M, elevator J', and reducing-drum M', having cylinders N N', provided with teeth n n', substantially as described, for the purpose specified.

In testimony that I claim the above I have hereunto subscribed my name in the presence of two witnesses.

GEORGE B. BERRELL.

Witnesses:
  OWEN DUNAUGHHOO,
  GEO. H. SEALEY.